United States Patent Office 3,057,844
Patented Oct. 9, 1962

3,057,844
DICHLORO TRIAZINYL (LOWER ALKYL) AMINO-NAPHTHOL-AZO-PHENYL DISAZO DYESTUFFS AND THE 1:1 COPPER COMPLEXES THEREOF
Herbert Francis Andrew, William Elliot Stephen, and Colin George Tilley, Manchester, England, assignors to Imperial Chemical Industries Limited, London, England, a corporation of Great Britain
No Drawing. Filed Aug. 11, 1958, Ser. No. 754,178
Claims priority, application Great Britain Aug. 16, 1957
6 Claims. (Cl. 260—146)

This invention relates to new azo dyestuffs and more particularly it relates to new disazo dyestuffs derived from cyanuric halides, valuable for the colouration of cellulosic textile materials in blue shades very fast to washing treatments, to light and to fading by burnt gas fumes.

According to the invention there are provided, as new azo dyestuffs, the compounds of the formula:

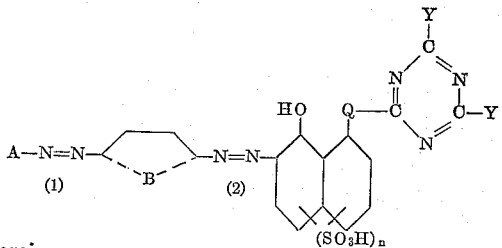

Wherein
A represents an aryl radical,
B represents the atoms necessary to make up the residue of a para-coupling amine of the benzene or naphthalene series,
Q represents an imino radical, an alkylimino radical or an m or p-iminobenzoylamino radical,
Y represents a halogen atom, and
n represents 1 or 2.

The new azo dyestuffs may be obtained from 1 molecular proportion of a naphthol of the formula:

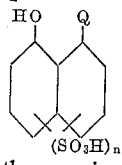

wherein Q and n have the meanings given above, 1 molecular proportion of the diazonium compound of an aminoazo compound of the formula:

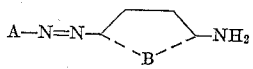

wherein A and B have the meanings given above, and at least 1 molecular proportion of a cyanuric halide, by interacting the naphthol with either of the other two starting materials and then interacting the product obtained with the third starting material.

Suitable naphthols for use in this process include, for example, 1-amino-8-naphthol-4 and 6-sulphonic acids, 1-amino-8-naphthol-3:6- and 4:6-disulphonic acids, 1-ethylamino-8-naphthol-3:6-disulphonic acid, and 1-butyl-amino-8-naphthol-3:6-disulphonic acid, and 1-(m- and p-aminobenzoylamino)8-naphthol 3:6-disulphonic acids.

The cyanuric halide used in the process may be, for example, cyanuric chloride or cyanuric bromide.

The aminoazo compounds used in the above process may be readily obtained by coupling a diazotised arylamine preferably one containing at least one sulphonic acid group, with a para-coupling amine of the benzene or naphthalene series.

Suitable arylamines include, for example, 4-sulphamyl-aniline, orthanilic acid, metanilic acid, sulphanilic acid, aniline-2:5-disulphonic acid, 4-nitraniline-2-sulphonic acid, 2-methoxy-aniline-5-sulphonic acid, 4-methoxy-aniline-2-sulphonic acid, 5-chloro-4-methyl-aniline-2-sulphonic acid, 2-naphthylamine-6-sulphonic acid, 2-naphthylamine-4:8-, 1:5- and 6:8-disulphonic acids, 4-methyl-aniline-2-sulphonic acid and 6-chloro-4-methyl-aniline-3-sulphonic acid.

Suitable para-coupling amines of the benzene or naphthalene series include, for example, aniline, 2-methoxy-5-methyl-aniline, 1-naphthylamine-6-sulphonic acid, m-toluidine, alpha-naphthylamine, o-anisidine, 2:5-dimethoxy-aniline, anthranilic acid and m-aminoacetanilide.

Thus, suitable para-coupling amines of the benzene series correspond to those having the formula:

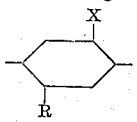

wherein X is a group capable of taking part in metal complex formation, and R stands for a hydrogen atom, a methyl group, or a methoxy group.

The process of the invention may be carried out by first interacting the diazonium compound with the naphthol by the methods commonly used for the manufacture of azo compounds and then treating the amino-disazo compound so obtained with the cyanuric halide; alternatively the process may be carried out by first interacting the naphthol with the cyanuric halide and then using the product so obtained as a coupling component and coupling it with the diazonium compound by the methods commonly-used for the manufacture of azo compounds.

In either method of performing the process of the invention, the intermediate product obtained by the first interaction may if desired be isolated and purified, before carrying out the second interaction but in general it is preferred to react the intermediate product obtained in situ with the third starting material.

In general it is preferred to use equimolecular proportions of the starting materials, but occasionally it may prove advantageous, in order to improve the yield or quality of the product, to use an excess of the cyanuric halide over the weight which is theoretically equivalent to the weight of the other reactant present.

When the naphthol is first interacted with the diazonium compound, the interaction is preferably carried out in the presence of an alkali, for example sodium carbonate. However, when the coupling is carried out as the second interaction, using as coupling component the interaction product of the cyanuric halide and the naphthol, it is preferred to use a reaction medium as weakly alkaline as will allow the coupling to take place efficiently so that side-reactions, especially the loss of halogen from the triazine nucleus, are reduced to a minimum. In general, when the coupling is carried out as the second interaction, a reaction medium having a pH between 6 and 8 is preferred.

When the cyanuric halide is employed as a reactant, whether in the first or the second interaction of the process, the interaction is preferably carried out in aqueous medium at a temperature between 0° C. and 5° C. If desired, an acid-binding agent for example sodium carbonate, may be added to the medium.

It is generally preferable to isolate the new dyestuffs from the media in which they have been formed at a pH from 6 to 8 and it has been found that the loss of halogen from the triazine rings in the dyestuffs can be reduced considerably by addition of certain buffering agents which give a pH value between 6 and 8 and in particular by those which give a pH of about 6.5. These buffering agents for example mixtures of disodium hydrogen phosphate and sodium dihydrogen phosphate or of disodium hydrogen phosphate and potassium dihydrogen phosphate may be added at any suitable time during the manufacture of the new dyestuffs, but a convenient procedure comprises addition of sufficient of an acid-binding agent such as sodium carbonate to the reaction mixture to give a pH between 6 and 8, then addition of buffering agent and then salt to precipitate the dyestuff, isolation of the latter by filtration and addition of more buffering agent to the dyestuff paste before drying.

The drying of the dyestuff paste is preferably carried out at a temperature below 65° C. The dried dyestuff compositions so obtained are frequently more stable than the unbuffered pastes or compositions.

A preferred class of the new azo dyestuffs is the class characterised in that the nucleus represented by

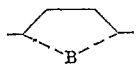

in the above formula, carries in ortho position to the azo group marked (2), a grouping such as methoxy, hydroxy, carboxy or carboxymethoxy, which is capable of taking part in metal complex formation. The metal complexes of the dyestuffs of this preferred class, especially the copper complexes, are especially valuable because of their very high fastness to light and form a further feature of the invention.

These metal complexes are preferably obtained by converting the amino-disazo compound (obtained according to the invention from a naphthol and a diazotized aminoazo compound containing a metallisable group ortho to the amino group) to its metal complex and then interacting the metal-containing amino-disazo compound so obtained with the cyanuric halide. This modified process forms yet a further feature of the invention. The alternative process of reacting one of the preferred class of the new azo dyestuffs with a metal-yielding agent has the disadvantage that the metallisation step has usually to be carried out under conditions such that there is considerable loss of the halogen attached to the triazine nucleus so that the yield of the desired metal-containing new azo dyestuff is very small.

The conversion of the amino-disazo compound into its metal complex may be carried out by any of the methods commonly used for converting a metallisable azo dyestuff into the appropriate metal complex thereof. The subsequent interaction of the metal-containing amino-disazo compound and the cyanuric halide may be carried out under the conditions described above in the paragraph describing the use of cyanuric halide as reactant; the metal-containing new azo dyestuffs so obtained may be isolated and stabilised as described above.

The new dyestuffs of the invention, in the form of their alkali-metal salts, are readily soluble in water. They are especially useful for the colouration of cellulosic textile materials in conjunction with a treatment with an acid-binding agent, for example by the process described in Belgian specification No. 543,218, wherein the coloured textile material is after-treated with an acid-binding agent, or by related processes wherein an acid-binding agent is applied to the textile material before or during the treatment with the dyestuff.

Whenso applied they give blue to violet shades which are very fast to washing treatments and to light and show little change on long exposure to the combustion products of coal-gas.

The invention is illustrated but not limited by the following examples in which parts and percentages are by weight:

*Example 1*

Diazotised orthanilic acid is coupled with 2-methoxy-5-methylaniline and the aminoazo compound obtained is diazotised and coupled under alkaline conditions with an equimolecular proportion of 1-amino-8-naphthol-3:6-disulphonic acid.

16 parts of the trisodium salt of the amino-disazo compound so obtained are dissolved in 350 parts of water. 4.6 parts of cyanuric chloride are dissolved in 80 parts of acetone and the solution is poured into a stirred mixture of 200 parts of ice and 100 parts of water. The solution of the amino-disazo dyestuff is added during 30 minutes to the suspension of cyanuric chloride keeping the temperature below 5° C. by the addition of ice.

The mixture is stirred for 1½ hours then neutralised to delta paper by adding 23 parts of 10% sodium carbonate solution.

There are then added 2.66 parts of disodium hydrogen phosphate and 4.34 parts of potassium dihydrogen phosphate and then 40 parts of sodium chloride and the mixture is then filtered. The residue on the filter is washed with 200 parts of acetone, filtered, and the product on the filter is dried at room temperature. The dyestuff powder so obtained contains 2.08 atoms of organically-bound chlorine for each diazo molecule present. When applied to cellulosic fibres by the methods described above it gives blue shades of excellent fastness to washing and light.

The following table describes further examples of new azo dyestuffs of the invention obtained by the method described in Example 1 above, by coupling a diazonium compound of the amine named in the first column (diazo component) with the amine named in the second column (middle component), diazotising the aminoazo compound so obtained and coupling with the naphthol named in the third column, and finally interacting the amino disazo compound so obtained with cyanuric chloride. The fourth column describes the shade given by the new azo dyestuff so obtained when applied to cellulosic textile materials by the methods described above.

| Diazo component | Middle component | Naphthol | Shade |
|---|---|---|---|
| (2) aniline-2:5-disulphonic acid | 2-methoxy 5-methyl-aniline | 1-amino-8-naphthol-3:6-disulphonic acid | Blue |
| (3) 4-nitraniline-2-sulphonic acid | do | do | Do. |
| (4) 2-methoxy-aniline-5-sulphonic acid | do | do | Do. |
| (5) Sulphanilic acid | do | do | Do. |
| (6) 4-methoxy-aniline-2-sulphonic acid | do | do | Do. |
| (7) 2-naphthylamine-4:8-disulphonic acid | do | do | Do. |
| (8) 5-chloro-4-methyl-aniline-6-sulphonic acid | do | do | Do. |
| (9) Metanilic acid | do | do | Do. |
| (10) 4-methylaniline-2-sulphonic acid | do | 1-amino-8-naphthol-4:6-disulphonic acid | Do. |
| (11) Orthanilic acid | do | do | Do. |
| (12) 6-chloro-4-methyl-aniline-3-sulphonic acid | do | do | Do. |
| (13) Sulphanilic acid | do | do | Do. |
| (14) Orthanilic acid | Orthoanisidine | 1-amino-8-naphthol-4:6-disulphonic acid | Do. |
| (15) 2-naphthylamine-4:8-disulphonic acid | do | 1-amino-8-naphthol-3:6-disulphonic acid | Do. |
| (16) 2-naphthylamine-4:8-disulphonic acid | 2:5-dimethoxy-aniline | do | Do. |
| (17) 4-nitraniline-2-sulphonic acid | 1-naphthylamine-6-sulphonic acid | do | Violet. |
| (18) 2-naphthylamine-4:8-disulphonic acid | m-Toluidine | do | Do. |
| (40) 2-naphthylamine-6:8-disulphonic acid | do | do | Blue. |
| (20) 2-naphthylamine-6:8-disulphonic acid | o-Anisidine | do | Do. |
| (21) 2-naphthylamine-5:7-disulphonic acid | do | do | Do. |
| (22) 6-chloro-4-amino-toluene-3-sulphonic acid | do | do | Do. |
| (23) 6-chloro-3-amino-toluene-4-sulphonic acid | do | do | Do. |
| (24) Aniline-2:4-disulphonic acid | 2-methoxy-5-methylaniline | do | Do. |
| (25) 6-nitro-3-amino benzoic acid | do | do | Do. |
| (26) 4-nitro-4'-amino stilbene-2:2'-disulphonic acid | o-Anisidine | do | Violet. |
| (27) p-Anisidine | Anthranilic acid | do | Do. |

Example 28

179 parts of the trisodium salt of the amino-disazo compound used in Example 1 are dissolved in 1600 parts of water. 150 parts of diethanolamine, 600 parts of 2 N copper sulphate and 110 parts of ammonia of specific gravity 0.88 are added to the solution and the mixture is stirred at between 95° and 100° C. for 25 hours.

500 parts of sodium chloride are then added and the mixture is filtered. The paste on the filter is redissolved in 1500 parts of water containing 15 parts of 70° Tw sodium hydroxide solution. The solution is screened and 300 parts of sodium chloride are added. The precipitated copper-containing amino-disazo compound is filtered off and dried.

135 parts of the copper-containing amino-disazo compound so obtained are dissolved in 750 parts of water containing 3 parts of 70° Tw sodium hydroxide solution.

40 parts of cyanuric chloride are dissolved in 320 parts of acetone and the solution is poured on a stirred mixture of 300 parts of ice and 200 parts of water. The solution of copper containing amino-disazo compound is added during 1 hour to the suspension of cyanuric chloride keeping the temperature below 5° C. by the addition of ice if necessary. 70 parts of 10% sodium carbonate are added throughout the addition at such a rate that the mixture at no time shows an alkaline reaction to delta paper. The mixture is stirred for 2 hours, then neutralised to delta paper by adding 30 parts of 10% sodium carbonate solution. 11.4 parts of disodium hydrogen phosphate and 18.6 parts of potassium dihydrogen phosphate are dissolved in 70 parts of water and this solution is added to the mixture. 200 parts of sodium chloride are then added and the mixture is filtered. The residue on the filter is washed with 400 parts of acetone and dried at room temperature. The dyestuff powder so obtained contains 1.98 atoms of organically bound chlorine for each disazo molecule present. When applied to cellulosic fibres by the methods described above it gives greenish blue shades of excellent fastness to washing and light.

By replacing the amino-disazo compound used as starting material in the above example by any of the amino-disazo compounds used in Examples 2 to 16 or 20 to 25 in the table following Example 1 other valuable dyestuffs are obtained which yield blue shades of excellent fastness to washing and light; violet dyestuffs are obtained by starting with those used in Examples 26 or 27.

Example 29

34.7 parts of 1-ethylamino-8-naphthol-3:6-disulphonic acid are dissolved in 140 parts of water and the solution is neutralised to litmus. 18.8 parts of cyanuric chloride are dissolved in 160 parts of acetone and the solution is poured into a stirred mixture of 160 parts of water and 160 parts of ice. The solution of 1-ethylamino-8-naphthol-3:6-disulphonic acid is added to the suspension of cyanuric chloride so formed the temperature being kept at from 0° to 3° C. and the pH at between 3 and 5. The mixture is stirred for 1 hour.

Diazotised metanilic acid is coupled with alpha-naphthylamine, and 34.9 parts of the sodium salt of the aminoazo compound obtained are diazotised in known manner. The diazonium compound is filtered off and added to the reaction mixture obtained as described in the previous paragraph.

Sodium carbonate is then added until the pH of the mixture is 6 and the mixture is stirred for 16 hours. Sodium chloride is then added at the rate of 5 parts of salt for each 100 parts of solution.

The precipitate is filtered off, mixed well with 4.2 parts of disodium hydrogen phosphate and 7.6 parts of potassium dihydrogen phosphate and the mixture is dried at 20° C.

The product so obtained colours cellulosic textile materials in blue shades having good fastness to severe washing.

The following table describes further examples of new azo dyestuffs of the invention obtained by the method described in Example 29 above, by interacting equimolecular proportions of cyanuric chloride and the naphthol named in the first column and coupling the product obtained with a diazonium compound of the aminoazo compound itself obtained from the diazo- and coupling (middle) components named in the second and third columns respectively of the table. The final column of the table describes the shade given by the new azo dyestuff so obtained when it is applied to cellulosic textile materials by the methods described above.

| Naphthol | Diazo component | Coupling (middle) component | Shade |
|---|---|---|---|
| (30) 1-ethylamino-8-naphthol-3:6-disulphonic acid. | Sulphanilic acid | 2-methoxy-5-methyl-aniline. | Blue. |
| (31) 1-ethylamino-8-naphthol-3:6-disulphonic acid. | 2-naphthylamine-6-sulphonic acid. | m-Toluidine | Violet. |
| (32) 1-ethylamino-8-naphthol-3:6-disulphonic acid. | 4-sulphamyl-aniline. | Aniline | Reddish violet. |
| (33) 1-butylamino-8-naphthol-3:6-disulphonic acid. | Orthanilic acid | 2-methoxy-5-methyl-aniline. | Blue. |

What we claim is:

1. Dyestuffs selected from the class consisting of compounds of the formula:

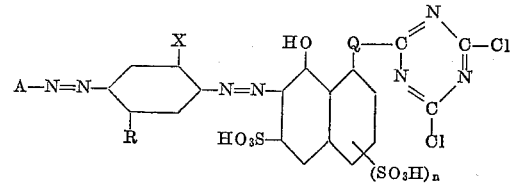

and the 1:1 copper complexes thereof, wherein:

A stands for a radical selected from the class consisting of benzene, naphthalene, and stilbene radicals substituted by from one to three groups selected from the class consisting of sulpho, sulphamyl, carboxyl, chlorine, methyl, nitro, and methoxy;

X is a radical selected from the class consisting of hydroxy, methoxy, carboxy, and carboxy-methoxy;

R is a radical selected from the class consisting of hydrogen, methyl, and methoxy;

Q is a member selected from the class consisting of the imino and lower alkylimino groups; and n is one of the numbers 0 and 1.

2. The copper complex of the dyestuff of the formula:

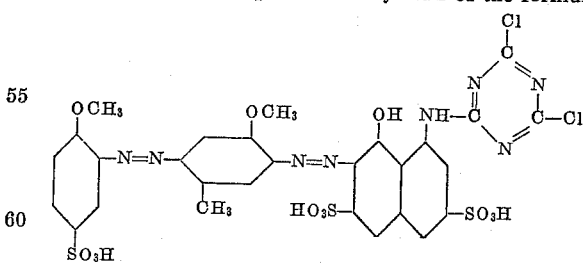

wherein A stands for a radical selected from the class consisting of benzene, naphthylene, and stilbene nuclei substituted by from one to three radicals selected from the class consisting of sulphonic, sulphamyl, carboxy, chlorine, methyl, nitro, and methoxy.

3. The dyestuff which as, in its free acid non-metallized state, the formula:

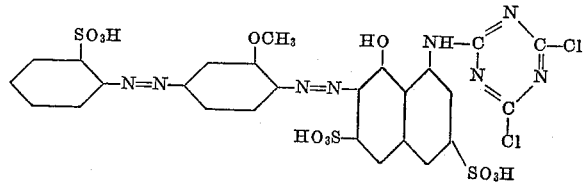

4. The 1:1 copper complex of the dyestuff of claim 3.
5. The dyestuff which has, in its free acid non-metallized state, the formula:
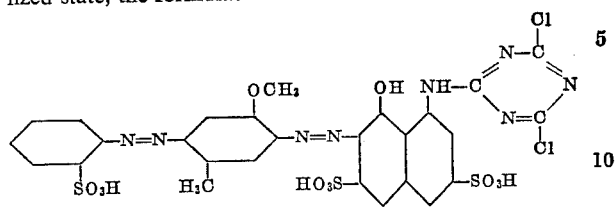
6. The 1:1 copper complex of the dyestuff of claim 5.
References Cited in the file of this patent
UNITED STATES PATENTS
| | | |
|---|---|---|
| 1,958,327 | Winkler | May 8, 1934 |
| 2,268,919 | Anderau | Jan. 6, 1942 |
| 2,396,659 | Kaiser | Mar 19, 1946 |
| 2,722,527 | Wehrli et al. | Nov. 1, 1955 |
| 2,860,128 | Gunst | Nov. 11, 1958 |
OTHER REFERENCES
Boyle: "The Industrial Chemist," August 1939, pp. 331–333.